US008787999B2

(12) United States Patent
Tekletsakik (10) Patent No.: US 8,787,999 B2
(45) Date of Patent: Jul. 22, 2014

(54) FAULT CURRENT LIMITED SYSTEM WITH CURRENT SPLITTING DEVICE

(75) Inventor: Kasegn D. Tekletsakik, Middleton, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 117 days.

(21) Appl. No.: 13/444,379

(22) Filed: Apr. 11, 2012

(65) Prior Publication Data

US 2012/0264613 A1 Oct. 18, 2012

Related U.S. Application Data (60) Provisional application No. 61/475,976, filed on Apr. 15, 2011.

(51) Int. Cl.
*H01L 23/48* (2006.01)
(52) U.S. Cl.
USPC ........................................................ 505/191
(58) Field of Classification Search
USPC ................ 361/19; 505/191, 220, 850
See application file for complete search history.

(56) References Cited

U.S. PATENT DOCUMENTS

| 5,892,644 A * | 4/1999 | Evans et al. ..................... 361/19 |
| 7,180,396 B2 * | 2/2007 | Bock et al. ..................... 336/100 |
| 7,675,719 B2 * | 3/2010 | Ko et al. ......................... 361/19 |
| 2009/0190274 A1 * | 7/2009 | Ko et al. ......................... 361/19 |
| 2010/0046125 A1 | 2/2010 | Husband et al. |
| 2012/0264613 A1 * | 10/2012 | Tekletsadik ................... 505/150 |

FOREIGN PATENT DOCUMENTS

| EP | 0350916 | * | 1/1990 |
| EP | 0350916 A2 | | 1/1990 |

* cited by examiner

*Primary Examiner* — Colleen Dunn (57) ABSTRACT

A fault current limiter system including a fault current limiter and a variable shunt current splitting device. The current splitting device includes first and second conductive windings, wherein the first conductive winding is connected in parallel with the fault current limiter and is configured to carry current in a first direction. The second conductive winding is electrically connected in series with the fault current limiter and is configured to carry current in a second direction opposite to the first direction so that the reactance of the first winding is negated by the reactance of the second winding during steady state operation of the fault current limiter system. Thus, a first portion of a steady state current is conveyed through the fault current limiter and a second portion of the current is conveyed through the current splitting device. The steady state current load on the fault current limiter is thereby reduced.

11 Claims, 6 Drawing Sheets

FAULT CURRENT LIMITED SYSTEM WITH CURRENT SPLITTING DEVICE

CROSS-REFERENCE TO RELATED APPLICATIONS

This is a non-provisional of pending U.S. provisional patent application Ser. No. 61/475,976, filed Apr. 15, 2011, the entirety of which application is incorporated herein by reference.

FIELD OF THE DISCLOSURE

This disclosure relates to fault current limiters, and more particularly to a fault current limiter system having a fault current limiter and a variable shunt current splitting device configured to reduce the steady state current flowing through the fault current limiter.

BACKGROUND OF THE DISCLOSURE

A fault current limiter (FCL) is a device that limits fault currents, typically in a power system. Various types of FCLs have been developed over the last several decades, including superconducting fault current limiters (SCFCLs), solid state fault current limiters, inductive fault current limiters, as well as other varieties that are well known in the art. A power system in which a FCL is implemented may include generation, transmission, and distribution networks that generate and deliver power to various industrial, commercial, and/or residential electrical loads.

A fault current is an abnormal current in an electrical system that may result from a fault in the system, such as a short circuit. A fault current may arise in a system due to any number of events or failures, such as power lines or other system components being damaged by severe weather (e.g. lightning strikes). When such a fault occurs, a large load can instantaneously appear in the circuit. In response, the network delivers a large amount of current (i.e. fault current) to the fault load. This surge of current is undesirable because it can damage the load which may be, for example, the network itself or equipment connected to the network.

Figure 1A:
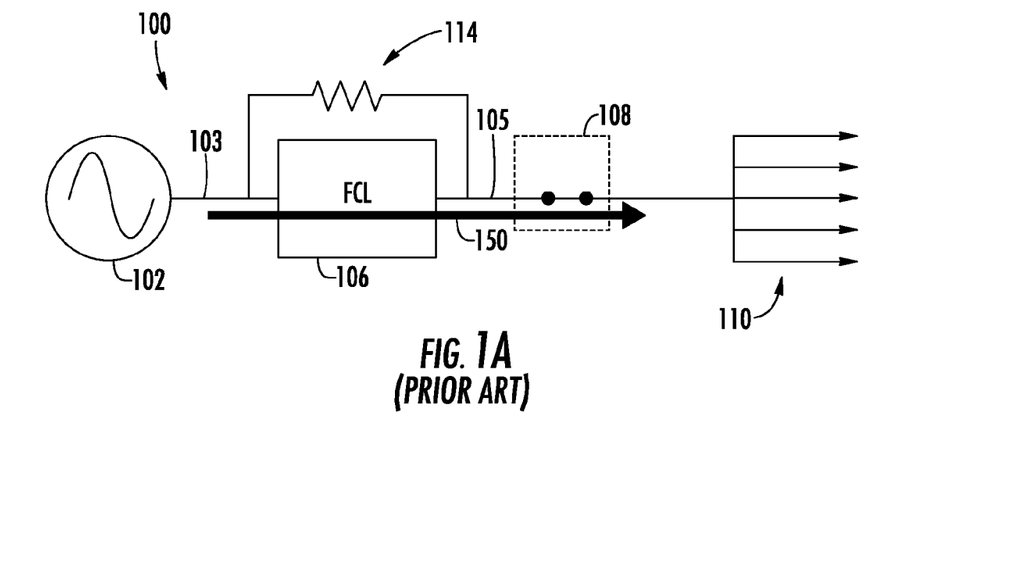
FIG. 1A is a circuit diagram of a power system of the prior art having a FCL and a fixed shunt in a steady state condition.

FIG. 1A depicts a circuit diagram of an exemplary prior art power system 100 having a FCL with a conventional fixed shunt 114 illustrated in a steady state condition. The exemplary power system 100 includes an AC power source 102, a circuit breaker 108 which is normally closed, and various loads 110. Under steady state conditions, the AC power source 102 provides power to the loads 110. The circuit breaker 108 is closed and 100% of the current from the AC power source flows through conductor 103, the FCL 106, and the conductor 105 to the loads 110, as illustrated by arrow 150.

Figure 1B:
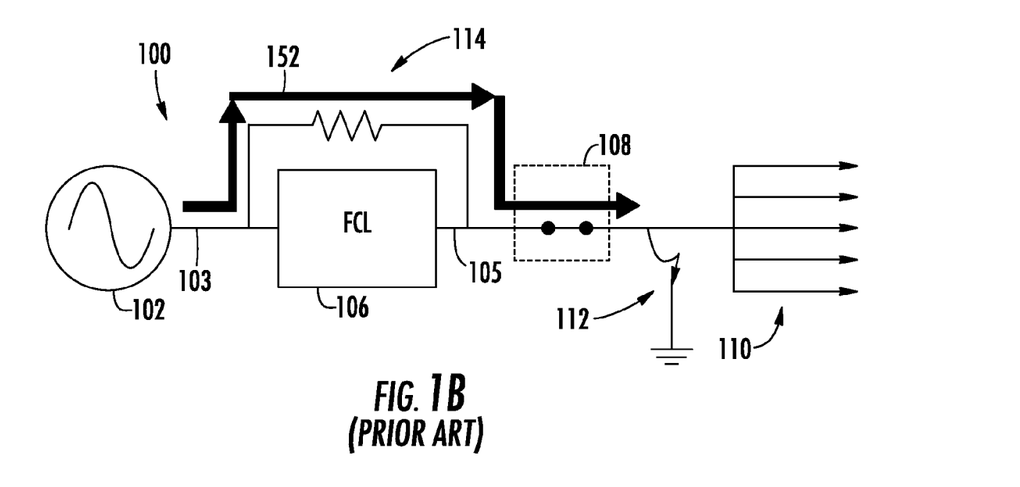
FIG. 1B is a circuit diagram of the prior art consistent with FIG. 1A in a fault condition.

FIG. 1B depicts the circuit diagram of FIG. 1A illustrated in a fault condition before the circuit breaker 108 has opened. For example, a fault condition may occur at location 112 represented by the inadvertent path to ground. In response to the fault, the AC power source 102 attempts to deliver a large amount of fault current to the fault load and the FCL 106 exhibits a resistance much larger than the fixed shunt 114. For example, if the FCL is a superconducting FCL ("SCFCL") having a superconductor that exhibits essentially zero resistance in a superconducting, steady state condition, the fault current causes the superconductor to quench and thereby exhibit a resistance much larger than that of the fixed shunt 114. Since the resistance of the FCL is much larger, the fault current represented by arrow 152 is commutated into the fixed shunt 114. The fixed shunt 114 limits the fault current to an acceptable level by reducing the peak-to-peak amplitude of the fault current before the circuit breaker 108 can open. A conventional circuit breaker 108 typically takes 2 to 5 cycles of a conventional 60 Hz frequency before opening. During a post fault time interval, the circuit breaker 108 opens and no current is provided to the loads 110 either through the FCL or the fixed shunt 114.

Although fixed shunt FCL systems such as the one described above can be very effective for limiting fault currents, a significant drawback of such systems is that the FCL must be configured to carry all of the anticipated steady state current of the circuit during normal operation, as described above with reference to FIG. 1A. In high current applications this generally requires a FCL having a large physical footprint and high energy consumption. For example, in the case of a SCFCL, the FCL will include a superconductor housed in a cryogenic tank (cryostat). To operate at a nearly zero impedance, superconducting state, the superconductor must be operated below its critical temperature, critical current density, and critical magnetic field. If any one of these three levels is exceeded, the superconductor quenches from its superconducting state to a normal state and exhibits resistance much larger than the resistance of the fixed shunt 114. To maintain the superconductor at a temperature below its critical temperature, a refrigeration system delivers a cryogenic cooling fluid to the cryostat. Accordingly, the quantity of the superconductor material, as well as the capacity of the associated cooling system to maintain the superconductor below its critical temperature, must be sufficient to accommodate all of the steady state current in the system. This may require significant equipment and energy costs. In addition, the physical size of a SCFCL required for a particular application can make installation at the application site difficult or impractical. Similar challenges exist in systems that employ solid state fault current limiters, which employ large numbers of parallel components, exhibit high power losses, and require large and costly cooling systems for handling high system load currents. It is with respect to these and other considerations that the present improvements have been needed.

SUMMARY

In view of the forgoing, a current splitting system for facilitating reduced steady state current handling in a fault current limiter is disclosed. In particular, a FCL system that includes a current splitting device with a variable shunt is disclosed.

An embodiment of a FCL system in accordance with the present disclosure may include a FCL electrically coupled with a variable shunt. The FCL may be any type of FCL, such as a superconducting FCL, a solid state FCL, or an inductive FCL. The current splitting device may include first and second conductive windings wound about a core, such as in a bifilar arrangement or other configuration that facilitates a strong magnetic coupling between the windings, wherein the presence or loss of such coupling introduces a variable impedance (shunt) to be used for current limiting applications. The first conductive winding may be electrically connected in parallel with the fault current limiter and is configured to carry current in a first direction. The second conductive winding may be electrically connected in series with the fault current limiter and is configured to carry current in a second direction opposite to the first direction.

During steady state operation of the FCL system, the current splitting device splits current into two branches that flow through the conductive windings in opposite directions to produce a net zero or negligible magnetic field, thereby resulting in a negligible equivalent or net impedance in the circuit. The reactance of the first winding is therefore substantially negated by the oppositely-directed reactance of the second winding. Thus, by selecting first and second windings having appropriate numbers of turns, a predetermined portion of steady state current can be routed through the variable shunt. The steady state current load on the FCL is thereby reduced relative to conventional FCL systems. The cost and physical size of the FCL can therefore also be reduced.

Upon the occurrence of a fault condition, the FCL is driven into a fault state wherein the impedance exhibited by the FCL increases and the proportion of current through the second winding and the FCL is significantly reduced relative to the first winding compared to the proportion of the currents during steady state operation. Thus, the first and second windings will no longer produce equal and opposing magnetic fields and will lose their strong magnetic coupling. The windings will therefore exhibit a higher equivalent or net current-limiting impedance relative to steady state operation, thereby limiting the fault current in the system. In the case of a superconducting FCL, the fault state is achieved by causing the FCL to quench, whereby the proportion of the current through the FCL is reduced.

An embodiment of the device disclosed herein can thus include a fault current limiter system comprising a fault current limiter and a variable shunt. The variable shunt may comprise first and second conductive windings wound about a core, wherein the first conductive winding is electrically coupled in parallel with the fault current limiter and is configured to carry current in a first direction. The second conductive winding is electrically coupled in series with the fault current limiter and is configured to carry current in a second direction opposite to the first direction so that a first reactance of the first winding is at least partially cancelled by a second reactance of the second winding during steady state operation of the fault current limiter system. Thus, a first portion of a steady state current is conveyed by the fault current limiter and a second portion of the steady state current is conveyed by the variable shunt.

BRIEF DESCRIPTION OF THE DRAWINGS

By way of example, a specific embodiment of the disclosed device will now be described, with reference to the accompanying drawings, in which.

DETAILED DESCRIPTION

Figure 2A:
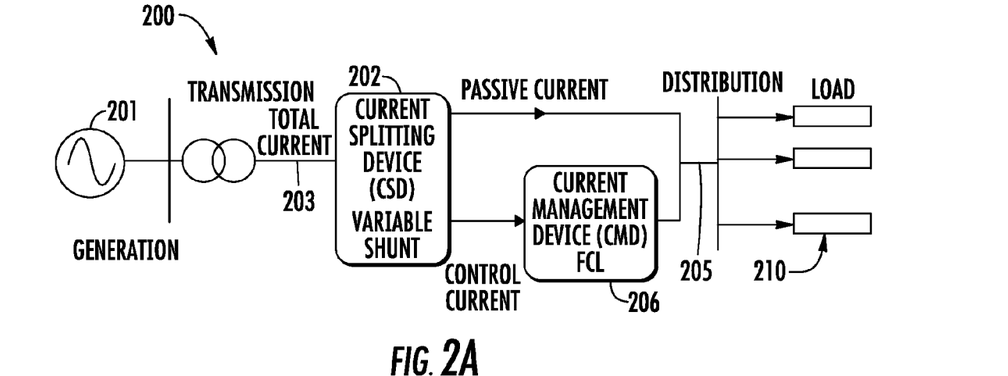
FIG. 2A is a circuit diagram of a FCL system consistent with an embodiment of the disclosure.
Figure 2B:
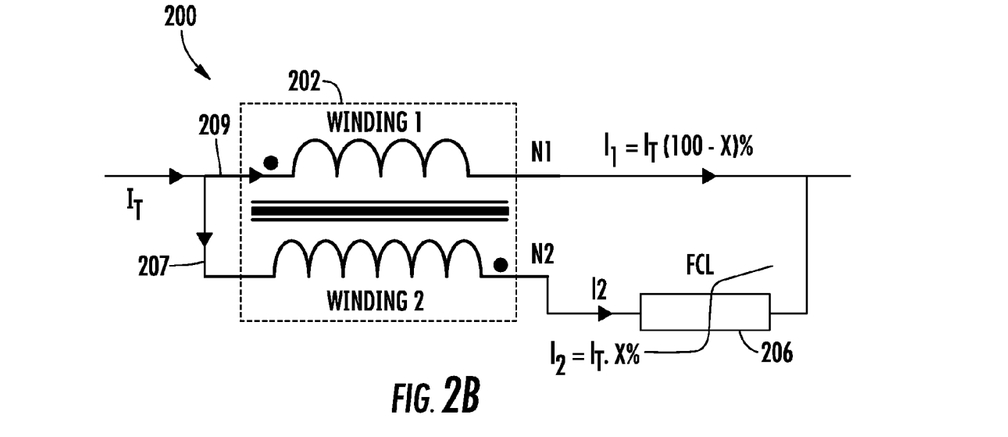
FIG. 2B is a circuit diagram consistent with FIG. 2A in a steady state condition.
Figure 2C:
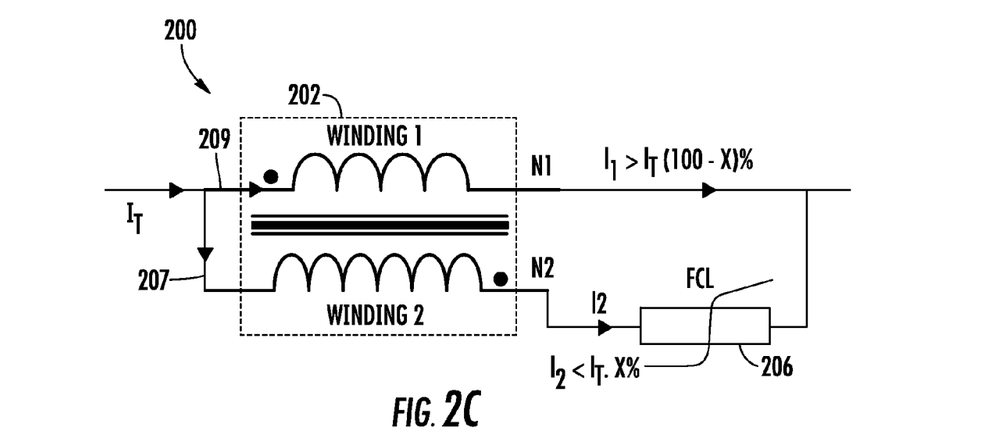
FIG. 2C is a circuit diagram consistent with FIG. 2A in a fault condition.

FIGS. 2A-2C and 4 illustrate circuit diagrams of a fault current limiter (FCL) system 200 consistent with an embodiment of the present disclosure. In particular, the FCL system 200 may comprise a current splitting device 202 coupled with a FCL 206. FIG. 2B illustrates the FCL system 200 during steady state operation and FIG. 2C illustrates the FCL system 200 during a fault condition as further described below.

The FCL system 200 can be electrically connected in series intermediate an AC power source 201 and one or more electrical loads 210 via conductors 203 and 205. It will be appreciated by those of ordinary skill in the art that the FCL system 200 can be implemented in a variety of other applications and power system configurations in which fault current limiting is desirable. The particular power system depicted in FIGS. 2A-2C is therefore shown by way of example only and is not intended to be limiting.

It is contemplated that various types of FCLs can be implemented in the FCL system 200, including, but not limited to, superconducting fault current limiters (SCFCLs), solid state fault current limiters, inductive fault current limiters, and other types of fault current limiters that are well known in the art. For purposes of illustration, the FCL system 200 will be described herein as incorporating a superconducting FCL 206. However, it will be understood that any of the aforementioned varieties of FCLs, as well as many varieties of FCLs that are not explicitly named herein, can be substituted for the superconducting FCL 206 without departing from the present disclosure.

The current splitting device 202 includes first and second windings 404 and 406 that may be configured to exhibit minimal impedance during the steady state operation shown in FIG. 2B and a comparatively larger impedance during the fault condition shown in FIG. 2C as further described below, to effectively limit the fault current. Particularly, during the steady state condition shown in FIG. 2A, the windings 404 and 406 of the current splitting device 202 may be set to distribute the steady state current along parallel paths 207 and 209 in a predefined manner. For example, if x % of the steady state current flows along path 207 then the remainder (100–x) % of the steady state current flows along path 209. In one embodiment, the current may be distributed so that 50% flows along path 207 and 50% flows along path 209. In other embodiments, the ratio may be set to 40% that flows along path 207 and 60% that flows along path 209; 30% that flows along path 207 and 70% that flows along path 209, etc.

Again, FIG. 2B illustrates system 200 during a fault condition. During such a fault condition, the impedance of the FCL 206 is much greater than the impedance of the current splitting device 202 so the fault current is commutated into the first winding 404 of the current splitting device 202 (i.e. along path 209). The current splitting device 202 still exhibits an equivalent impedance that is great enough to limit the fault current to acceptable peak-to-peak amplitudes to loads 210.

Figure 3:
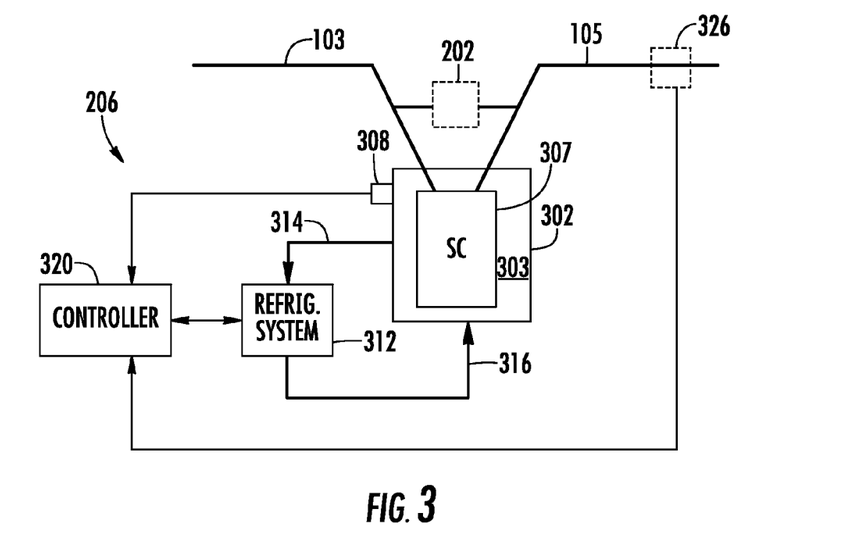
FIG. 3 is a block diagram of one embodiment of a SCFCL for use as the FCL depicted in FIGS. 2A and 2B.

FIG. 3 is a block diagram of an exemplary FCL 206 for use as the FCL system 200. FCL 206 may be an SCFCL that includes a cryogenic tank (cryostat) 302 defining an interior chamber 303, a superconductor 307 positioned within the chamber 303, a refrigeration system 312, a controller 320, a temperature sensor 308, and a current sensor 326. For ease of illustration and explanation, only one FCL 206 is illustrated for accommodating a single phase AC power system. Those skilled in the art will recognize that three separate FCLs can be similarly implemented for accommodating a three phase AC power system.

The superconductor 307 may be any type of superconducting material, such as yttrium barium copper oxide (YBCO), that exhibits suitable superconducting properties when held below its critical temperature, critical current density, and critical magnetic field. The superconductor 307 may include a plurality of modules depending on the amount of superconducting material required for a particular application (i.e. systems that convey larger electrical currents will generally require a FCL with greater amounts of superconducting material). The refrigeration system 312 is configured to maintain the temperature of the superconductor 307 below its critical temperature, which may be between about 77° K. and 93° K. for high temperature superconductors. This may be achieved by cycling a cryogenic cooling fluid through a cryostat 302 via a supply conduit 316 and return conduit 314 that are operatively connected to the refrigeration system 312 and the cryostat 302. In particular, the refrigeration system 312 may include a cryogenic cooling unit to cool the input cryogenic fluid received from the return conduit 314 before cycling the cooled fluid back to the cryostat 302 via supply conduit 316. The cryostat 302 can be fabricated from a variety of different materials, including, but not limited to, dielectric materials and/or thermally insulating materials. The cryogenic cooling fluid may be any suitable cooling fluid, including, but not limited to, liquid nitrogen, liquid helium, liquid argon, liquid neon, and various mixtures of the same. The refrigeration system 312 may further include various valves, pumps, and sensors for facilitating fluid movement and a storage tank for storing additional quantities of cryogenic cooling fluid.

The controller 320 may receive input signals from a variety of systems and components, such as the temperature sensor 308 and the current sensor 326 to manage the operation of the refrigeration system 312 in accordance with input signals as further described below. The controller 320 can be, or may include, a general-purpose computer or network of general-purpose computers that may be programmed to perform desired input/output functions. The controller 320 can also include other electronic circuitry or components, including, but not limited to, application specific integrated circuits, other hardwired or programmable electronic devices, and discrete element circuits. The controller 320 may further include communication devices (e.g. WiFi, Bluetooth, etc.), data storage devices, and software.

The temperature sensor 308 is provided for measuring the temperature of the superconductor 307 and/or the cryogenic cooling fluid within the interior chamber 303 of the cryostat 302 and outputting such temperature measurement to the controller 320. It is contemplated that any type of conventional temperature sensor that is capable of measuring low temperatures such as those achieved within the cryostat 302 can be utilized. The temperature sensor 308 is illustrated as being mounted on the outside of the cryostat 302, but this is not critical.

The current sensor 326 may be operatively connected to the conductor 205 at a position intermediate the current splitting device 202 and the loads 210. The current sensor 326 is provided for measuring the real-time current draw on conductor 205 and outputting such current draw measurement to the controller 320. It is contemplated that any type of conventional current sensor may be utilized, such as, for example, a current transformer positioned about the conductor 205.

In operation, the superconductor 307 will remain in a superconducting state until one of three parameters is exceeded, namely critical temperature, current density, and magnetic field. During steady state operation, the refrigeration system 312 may maintain the temperature of the superconductor 307 below its critical temperature which may be between about 77° K. and 93° K. for high temperature superconductors. The current splitting device 202 advantageously permits a portion of the steady state current to flow along this path. For example, 70% of the current may flow through the current splitting device 202 with the remaining 30% flowing through the FCL 206 in one embodiment. Therefore, the FCL 206, which may be an SCFCL, may be sized appropriately given the expected steady state current levels. For example, compared to a SCFCL for use with a fixed shunt, the quantity of superconducting material necessary for the superconductor 307 may be reduced, the size of the cryogenic tank 302 may therefore also be smaller, and the capacity of the refrigeration system 312 may also be reduced accordingly including the necessary volume of cryogenic fluid. In addition, energy costs for the refrigeration system 312 may also be reduced. Accordingly, significant material and energy cost savings may be realized. Furthermore, the physical size of the FCL 206 can be reduced enabling it to be installed in locations that may otherwise have been difficult, if not impractical.

Figure 4:
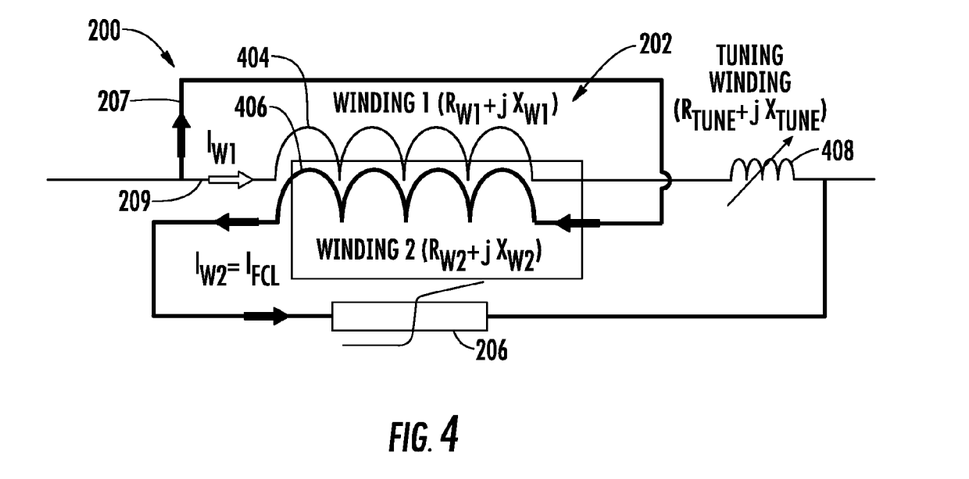
FIG. 4 is circuit diagram of a variable shunt configuration that is consistent with the present disclosure.

FIG. 4 illustrates a diagram of an exemplary embodiment of the current splitting device 202 consistent with the present disclosure that includes a first conductive winding 404 electrically connected in a reverse-parallel relationship with a second winding 406. Current entering the variable shunt 402 is directed through the first winding 404 in a first direction and through the second winding 406 in a second, opposite direction. The variable shunt 402 optionally further includes a conductive tuning winding 408 that is electrically connected in series with the first winding 404 for facilitating precise tuning of the current limiting in the system in a manner that will become apparent below. The windings 404 and 406 may be wound about a core (e.g. core 603 shown in FIG. 6), such as, for example, in a bifilar coil arrangement. Other winding arrangements are available and will be described below. It is contemplated that the core may be an iron core or an air core having dimensions that are dictated by the current limiting requirements of a particular application as will be appreciated by those of ordinary skill in the art.

The first winding 404 of the variable shunt 402 is electrically connected in parallel with the FCL 206 and the second winding 406 of the variable shunt 402 is electrically connected in series with the FCL 206. During steady state operation of the system 200 (i.e. in the absence of a fault condition), the superconductor 307 will remain in a superconducting state and will exhibit substantially zero impedance. The current flowing through the first winding 404 will therefore be substantially equal to the current flowing through the second winding 406 and, because the windings 404 and 406 are arranged in the above-described reverse-parallel configuration, the windings will be magnetically-coupled and will exhibit a negligible net or equivalent impedance.

Thus, by selecting first and second windings 404 and 406 having appropriate numbers of turns, the steady state operation of the system 200 may be tailored to distribute steady state current along parallel paths 207 and 209 such that if x % of the steady state current flows along path 207 the remainder (100−x) % of the steady state current flows along path 209. In one embodiment, for example, first and second windings 404 and 406 may be selected with appropriate numbers of turns for evenly distributing the current in the FCL system 200 between the paths 207 and 209, with 50% of the current flowing along path 207 and 50% flowing along path 209. In other contemplated embodiments, the ratio may be set to 40/60, 30/70, 20/80, etc., for example, along respective paths 207 and 209. In some cases where current distribution must be set more precisely, the external tuning winding 408 can implemented as an optional device.

Upon the occurrence of a fault condition, such as illustrated in FIG. 2C, the current through the system 200 suddenly increases where the increased fault current is measured by the current sensor 326 (shown in FIG. 3). Upon receiving output from the current sensor 326 indicating a fault current above a predefined level, the controller 320 immediately "trips" the FCL 206. In other words, the controller 320 causes the FCL 206 to go into a fault state wherein the FCL 206 exhibits an impedance that is much greater than that of the first winding 404. In the particular case where FCL 206 is a SCFCL, this is achieved by causing the FCL 206 to quench, thereby driving the FCL 206 into a high impedance, non-superconducting state wherein the impedance of the FCL 206 is much greater than the impedance of the second winding 406. Therefore, the fault current is commutated into the first winding 404. The magnetic fields produced by the first and second windings 404 and 406 become decoupled and no longer cancel one another, and the impedance of the first winding increases to a current limiting impedance that effectively limits the fault current and acts as a shunt reactor for the FCL 206. During recovery, the FCL 206 recovers and $I_{W2}$ increases and eventually may reach the value of $I_{W1}$ and hence there is reactance cancellation again.

Returning briefly to FIGS. 2C and 4, the relatively high impedance of the path 205 (which includes the tripped FCL 206 and the second winding 406) relative to the path 207 (which includes the first winding 404 and, optionally, the tuning winding 408) during a fault condition results in substantially the entire fault current being commutated to the first winding 404 of the current splitting device 202. The current through the second winding 406 is therefore no longer sufficient to cancel the magnetic field generated by the first winding 404, and the total impedance of the first winding 404 is thus greater than that exhibited during steady state operation. Thus, the current splitting device 202 acts as a shunt reactor for the FCL 206 and exhibits an impedance that is great enough to limit the fault current to acceptable peak-to-peak amplitudes. During recovery, as the FCL 206 returns to a steady state condition, currents through the first and second windings 404 and 406 may eventually return to their steady state values, thereby achieving the steady state reactance-cancellation described above.

In view of the above-described configuration of the system 200, with the current splitting device 202 handling a significant portion of the steady state current in the system 200, the FCL 206 may be sized to handle much less steady state current than it would otherwise be required to accommodate. Material and labor costs may therefore be reduced. The physical size of the FCL may also be reduced, enabling it to be installed in locations that may otherwise have been difficult, if not impractical. In addition, electromagnetic forces and their effects could also be reduced due to less active FCL components. The amount of energy dissipated in the FCL 206 may also be reduced. When the FCL 206 is a SCFCL, the quantity of superconducting material may be reduced by 50% in the case that 50% of the steady state current is diverted to the current splitting device 202. Less energy is therefore required to cool the superconducting material below its critical temperature. The refrigeration system capacity may also be reduced, including the volume of cryogenic fluid required, thereby realizing further cost and space savings relative to conventional fault current limiters.

Figure 2D:
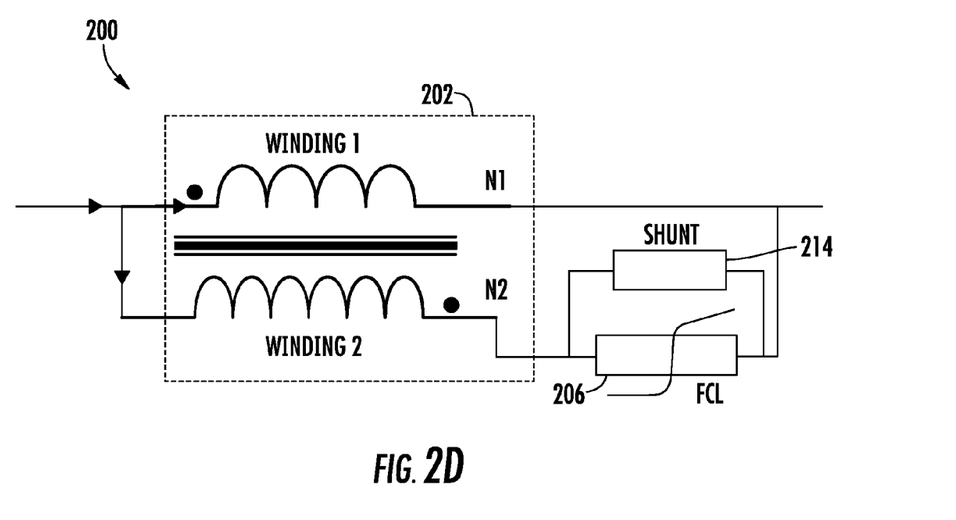
FIG. 2D is a circuit diagram consistent with an alternative embodiment of the disclosure with a voltage control shunt.
Figure 2E:
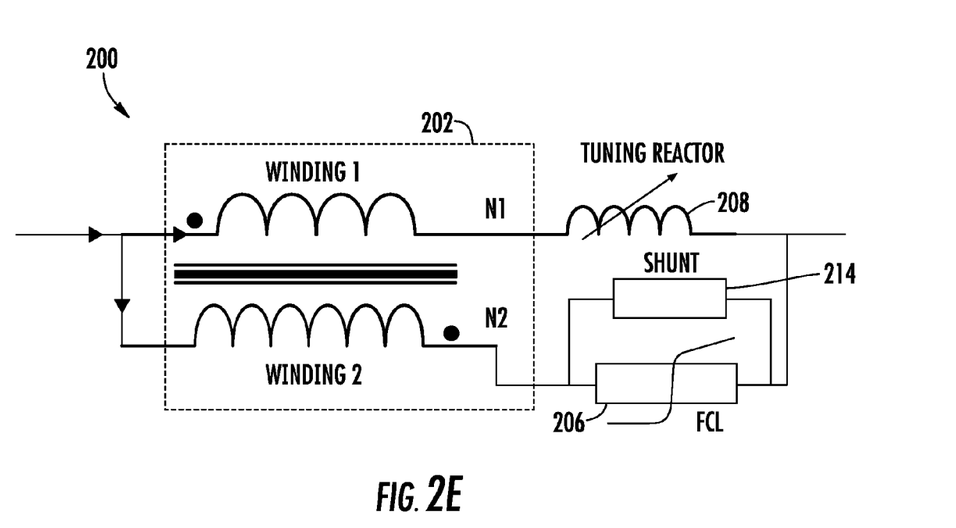
FIG. 2E is a circuit diagram consistent with an alternative embodiment of the disclosure with a voltage control shunt and a tuning reactor.

Alternative embodiments of the FCL system 200 are contemplated in which a fixed shunt 214 (voltage control shunt) is coupled in parallel with the FCL 206 for facilitating voltage control in a conventional manner, either without or with an external tuning reactor 208 as shown in FIGS. 2D and 2E, respectively. The voltage control shunt may be a reactor, a resistor, a varistor (MOV) or any other electrical device that clamps or sets the voltage to a desirable value.

Figure 5:
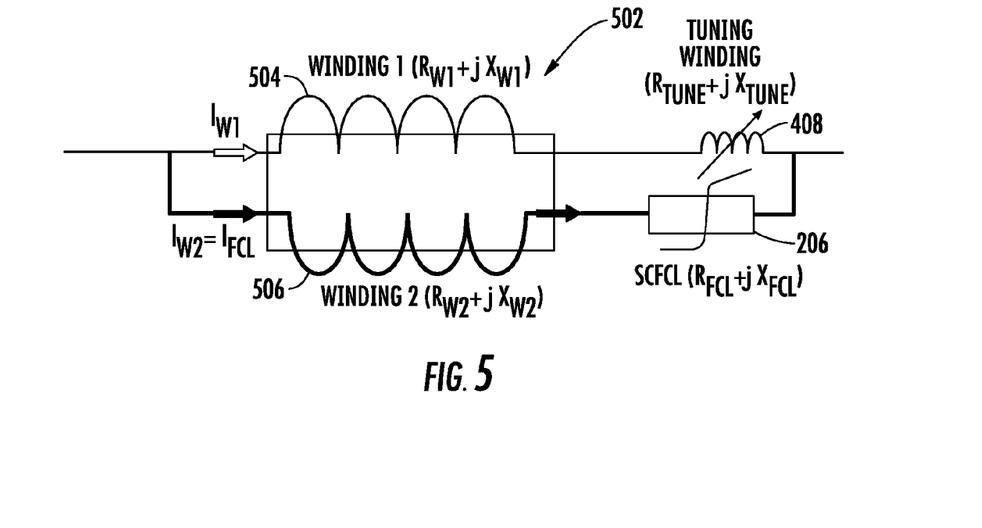
FIG. 5 is a circuit diagram of an alternative variable shunt configuration consistent with the present disclosure having concentric windings.
Figure 6:
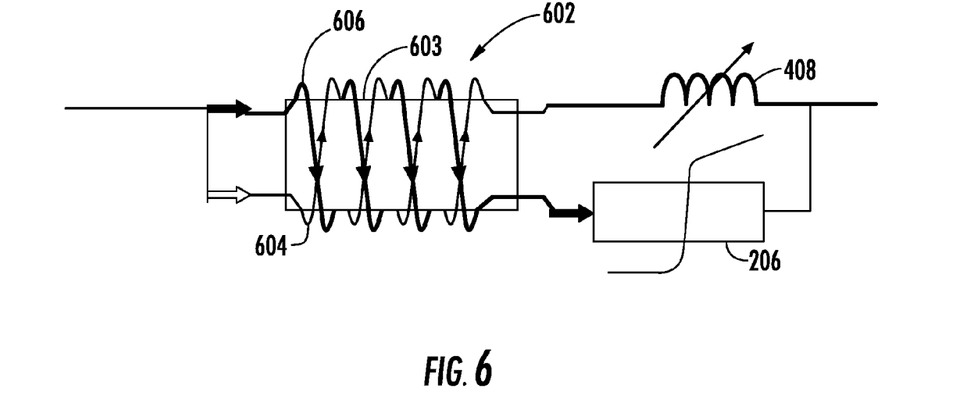
FIGS. 6 and 7 are circuit diagrams of further alternative variable shunt configurations that are consistent with the present disclosure having crisscrossed windings.
Figure 7:
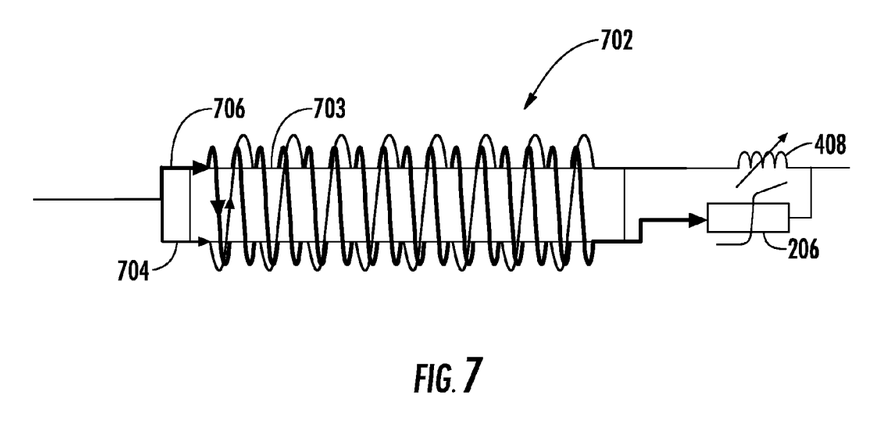

Although the first and second windings 404 and 406 are illustrated FIG. 4 in a bifilar coil arrangement, other winding configurations are contemplated and can alternatively be implemented in the current splitting device 202. For example, FIG. 5 illustrates a variable shunt 502 having a first winding 504 and second winding 506 wound in an opposing concentric arrangement. The tuning winding 408 is connected in series to the first winding 504 and the second winding 506 is connected to FCL 206. In another example, FIG. 6 illustrates a variable shunt 602 having a first winding 604 and second winding 606 wound about a magnetic core 603 in a crisscrossed arrangement with each winding having an equal number of turns. Again, the first winding 604 is connected to tuning winding 408 and the second winding 606 is connected to FCL 206. In another example, FIG. 7 illustrates a variable shunt 702 having a first winding 704 and a second winding 706 wound about a magnetic core 703 in a crisscrossed arrangement with an unequal number of turns to further control and limit the distribution of steady state current flow through the FCL 706. The first winding 704 is connected to tuning winding 408 and the second winding 706 is connected to FCL 206.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:
1. A fault current limiter system comprising:
   a fault current limiter;
   a shunt electrically connected in parallel to the fault current limiter; and
   a current splitting device comprising first and second conductive windings wound about a core,
   wherein the first conductive winding is electrically connected in parallel with the fault current limiter and the shunt, and the first conductive winding is configured to carry current in a first direction, and
   wherein the second conductive winding is electrically connected in series with the fault current limiter and the shunt, and is configured to carry current in a second direction opposite to the first direction such that a first magnetic field associated with the first winding is coupled with a second magnetic field associated with the second winding during steady state operation of the fault current limiter system.

2. The fault current limiter system of claim 1, wherein the first and second windings of the current splitting device are configured to magnetically decouple and increase an equivalent impedance of the current splitting device to limit an amount of current delivered to a load during a fault condition.

3. The fault current limiter system of claim 1, wherein the fault current limiter comprises a superconducting fault current limiter.

4. The fault current limiter system of claim 1, wherein the fault current limiter comprises a solid state fault current limiter.

5. The fault current limiter system of claim 1, wherein the fault current limiter comprises an inductive fault current limiter.

6. The fault current limiter system of claim 1, wherein the current splitting device is configured to convey an amount of steady state current less than a total system current during steady state operation of the fault current limiter system.

7. The fault current limiter system of claim 1, wherein the current splitting device further comprises a tuning winding connected in series with the first winding for facilitating fine tuning of an impedance and current distribution of the current splitting device.

8. The fault current limiter system of claim 1, wherein the first and second windings are wound in a bifilar coil arrangement.

9. The fault current limiter system of claim 1, wherein the first and second windings are wound in an opposing, concentric arrangement.

10. The fault current limiter system of claim 1, wherein the first and second windings are wound in a crisscrossed arrangement with an equal number of turns.

11. The fault current limiter system of claim 1, wherein the first and second windings are wound in a crisscrossed arrangement with an unequal number of turns.

* * * * *